(12) United States Patent
Wang et al.

(10) Patent No.: US 8,465,270 B2
(45) Date of Patent: Jun. 18, 2013

(54) INJECTION MOLD

(75) Inventors: Xian-Yun Wang, Guang-Dong (CN);
Xiao-Ping Wu, Guang-Dong (CN);
Kun-Hsueh Chiang, New Taipei (TW)

(73) Assignee: Cheng UEI Precision Industry Co., Ltd., New Taipei (TW)

( * ) Notice: Subject to any disclaimer, the term of this patent is extended or adjusted under 35 U.S.C. 154(b) by 343 days.

(21) Appl. No.: 13/033,595

(22) Filed: Feb. 23, 2011

(65) Prior Publication Data
US 2012/0213877 A1    Aug. 23, 2012

(51) Int. Cl.
*B29C 45/14* (2006.01)
(52) U.S. Cl.
USPC ........ 425/117; 425/577; 425/441; 425/129.1; 425/556; 264/156; 264/272.15; 249/91
(58) Field of Classification Search
USPC .............. 425/110, 577, 568, 117, 129.1, 556, 425/441; 264/156, 328.1, 275, 272.15; 249/91
See application file for complete search history.

(56) References Cited

U.S. PATENT DOCUMENTS

| 5,183,615 | A | * | 2/1993 | Zushi | 264/219 |
| 7,108,311 | B2 | * | 9/2006 | Dooley et al. | 296/146.7 |
| 8,343,409 | B2 | * | 1/2013 | Brown et al. | 264/328.1 |
| 2007/0126138 | A1 | * | 6/2007 | Dooley et al. | 264/46.4 |
| 2009/0315218 | A1 | * | 12/2009 | Izumo | 264/328.12 |
| 2012/0242004 | A1 | * | 9/2012 | Smith | 264/328.1 |
| 2012/0267815 | A1 | * | 10/2012 | Tokunou | 264/51 |

* cited by examiner

*Primary Examiner* — Joseph S Del Sole
*Assistant Examiner* — Nahida Sultana
(74) *Attorney, Agent, or Firm* — Cheng-Ju Chiang

(57) ABSTRACT

An injection mold for molding an electronic product which has a terminal includes a movable mold, a first sliding block levelly defining a through-hole, a second sliding block, a supporting pole and a stationary mold. A top of the movable mold defines an opening of which a bottom defines a fastening hole for fastening a bottom of the terminal therein. An inner sidewall of the second sliding block defines a groove for restraining a top of the terminal. The first and second sliding blocks are located at two opposite sides of the opening to together define a cavity for molding the electronic product. The supporting pole is movably inserted in the through-hole and stretches into the cavity to resist against the top of the terminal. The stationary mold is positioned on the first and second sliding blocks, and defines a sprue channel connected with the cavity.

4 Claims, 1 Drawing Sheet

INJECTION MOLD

BACKGROUND OF THE INVENTION

1. Field of the Invention

The present invention generally relates to an injection mold, and more particularly to an injection mold capable of fastening a terminal therein.

2. The Related Art

With the fast development of electronic technology, volume of the electronic product is becoming smaller and more delicate so that components of the electronic product are fragile and easily deformed. A traditional injection mold for fastening a terminal of the electronic product therein generally includes a stationary mold, a movable mold, a first sliding block and a second sliding block. When the injection mold is used to mold the electronic product with the terminal embedded therein, the first and second sliding blocks are movably mounted on two opposite sides of a top of the movable mold and spaced from each other. The stationary mold defines a sprue channel, and a middle of a top of the movable mold defines a fastening hole. A bottom end of the terminal is inserted in the fastening hole, and a top end of the terminal stretches between the first sliding block and the second sliding block. The stationary mold is disposed on tops of the first and second sliding blocks. So a cavity is formed among the stationary mold, the first and second sliding blocks and the movable mold. Then thermoplastic resins are injected into the cavity through the sprue channel to surround the terminal for molding the electronic product.

However, because the top end of the terminal stretches in the cavity without being restrained by any structures and the terminal is generally slim and small, as a result, the terminal is apt to sway randomly and even deform under the injection attach of the thermoplastic resins. As a result, the electronic product with the terminal embedded therein often has a lower production rate and the manufacturing cost thereof is accordingly increased.

SUMMARY OF THE INVENTION

An object of the present invention is to provide an injection mold for molding an electronic product which has a terminal. The injection mold includes a movable mold, a first sliding block, a second sliding block, a supporting pole and a stationary mold. A top of the movable mold defines an opening. A portion of a bottom of the opening extends downward to form a fastening hole for fastening a bottom end of the terminal therein. The first sliding block is movably mounted on one side of a top of the movable mold. The first sliding block defines a through-hole levelly penetrating therethrough. The second sliding block is movably mounted on the other side of the top of the movable mold. An inner sidewall of the second sliding block facing the first sliding block defines a groove vertically penetrating through a bottom thereof. The first and second sliding blocks are located at two opposite sides of the opening and capable of moving towards each other to make a top end of the terminal restrained in the groove. An inner sidewall of the first sliding block is further spaced from the top end of the terminal and the second sliding block to cooperate with the opening to together define a cavity. The through-hole has an inner end thereof connected with the cavity. The supporting pole is movably inserted in the through-hole and further stretches into the cavity to resist against a side of the top end of the terminal for further clipping the top end of the terminal between the supporting pole and the second sliding block. The stationary mold is capable of being positioned on the first and second sliding blocks to cooperate with the cavity for molding the electronic product. The stationary mold defines a sprue channel connected with the cavity.

As described above, the bottom end of the terminal is inserted in the fastening hole through the cavity, and the top end of the terminal is restrained in the groove to avoid the terminal moving upward or downward in the cavity. Moreover, the supporting pole is stretched into the cavity to resist against the top end of the terminal and clip the top end of the terminal between the supporting pole and the second sliding block, so that can further prevent the terminal randomly swaying in the cavity. So the terminal is located in the cavity firmly. As a result, a deformation of the electronic product is avoided accordingly in process of injecting thermoplastic resins into the cavity. Furthermore, production rate of the electronic product can be assured, and cost of manufacturing the electronic product is lowered.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
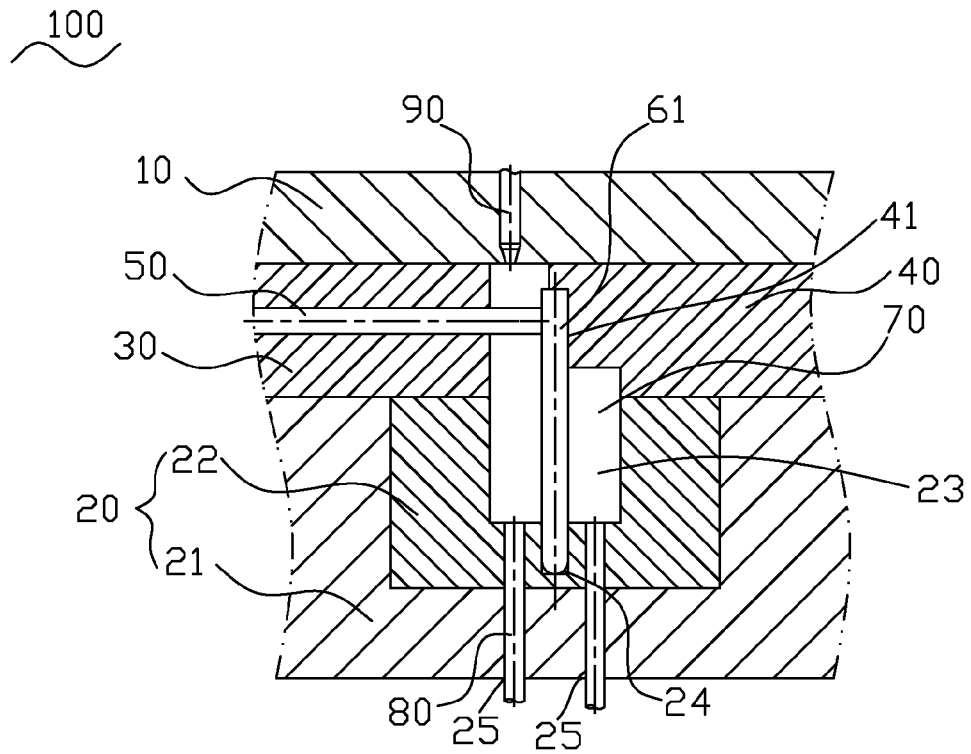
FIG. 1 is a cross-sectional view of an injection mold according to the present invention, wherein a terminal is mounted in the injection mold.
Figure 2:
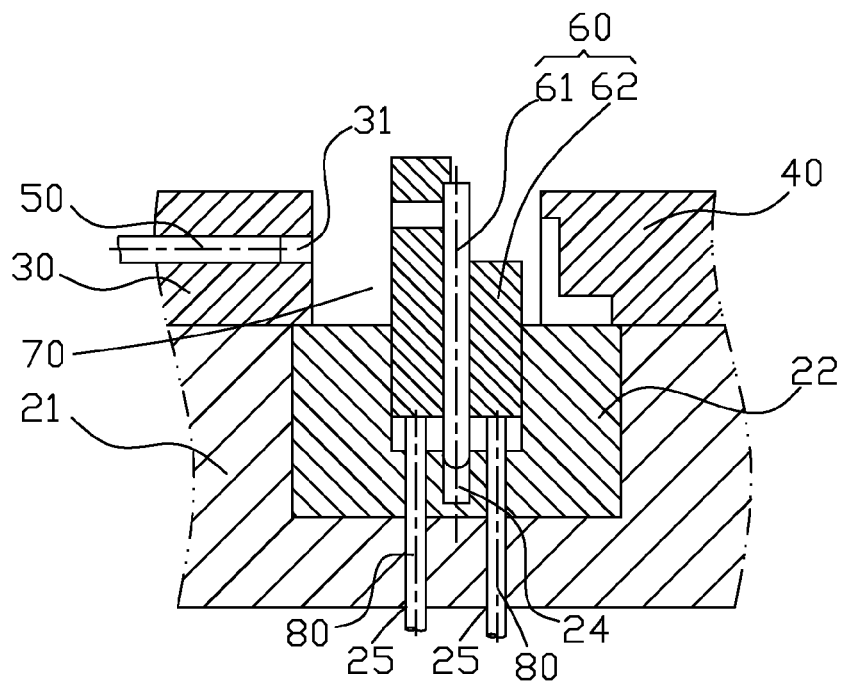
FIG. 2 is a cross-sectional view of the injection mold of FIG. 1, wherein a stationary mold is removed away, and an electronic product is ejected out of the injection mold.

Referring to FIGS. 1-2, an injection mold 100 for molding an electronic product 60 therein includes a stationary mold 10, a movable mold 20, a first sliding block 30, a second sliding block 40, a supporting pole 50 and two ejector pins 80 mounted on a fixing plate (not shown).

Referring to FIGS. 1-2, the movable mold 20 has a movable mold plate 21 and a movable mold core 22 mounted in a middle of a top of the movable mold plate 21. A middle of a top of the movable mold core 22 defines an opening 23. A middle of a bottom of the opening 23 extends downward to form a fastening hole 24. The movable mold 20 abreast defines two ejector pin holes 25 each extending vertically to penetrate through the movable mold plate 21 and the movable mold core 22 and communicate with the opening 23. The ejector pin holes 25 are further opened at two opposite sides of the fastening hole 24. A top of the stationary mold 10 defines a sprue channel 90 vertically penetrating therethrough. The first sliding block 30 and the second sliding block 40 are slidably disposed on the movable mold 20 and located at two opposite sides of the opening 23 to move towards or away from each other. A substantial middle of the first sliding block 30 defines a through-hole 31 levelly penetrating through the first sliding block 30. An upper portion of an inner sidewall of the second sliding block 40 facing the first sliding block 30 is cut off to form a groove 41 vertically penetrating through a bottom of the second sliding block 40.

Referring to FIG. 1, each of the ejector pins 80 is of an elongated shape. A bottom end of the ejector pin 80 is fixed on the fixing plate and a top end of the ejector pin 80 is inserted in the corresponding ejector pin hole 25 of the movable mold 20. The fixing plate can move upward and downward with respect to the movable mold plate 21 to drive the ejector pins 80 to move up and down along the corresponding ejector pin holes 25.

Referring to FIGS. 1-2, when the injection mold 100 is used to mold the electronic product 60 with a terminal 61 embedded therein, a bottom end of the terminal 61 is inserted in the fastening hole 24 through the opening 23 and a top end of the terminal 61 projects out of the opening 23 to be located between the first and second sliding blocks 30, 40. The first and second sliding blocks 30, 40 move towards each other until insides of bottoms thereof are adjacent to the two opposite sides of the opening 23. At this time, the top end of the terminal 61 is received in the groove 41 with a top head thereof abutting against a top sidewall of groove 41 and a side thereof abutting against an inner sidewall of the groove 41 to avoid the terminal 61 moving upward or downward. Moreover, the tops of the first and second sliding blocks 30, 40 are spaced from each other to cooperate with the opening 23 to together define a cavity 70. The through-hole 31 has an inner end thereof connected with the cavity 70. Then the stationary mold 10 is covered on the first and second sliding blocks 30, 40, with a bottom of the sprue channel 90 connected with the cavity 70. The fixing plate moves upward to drive the ejector pins 80 to slide along the corresponding ejector pin holes 25, until top heads of the ejector pins 80 are level with a bottom face of the opening 23. The supporting pole 50 is movably inserted in the through-hole 31 and stretched into the cavity 70 to resist against another side of the top end of the terminal 61 and clip the top end of the terminal 61 between the supporting pole 50 and the second sliding block 40, so as to further prevent the terminal 61 randomly swaying in the cavity 70. So the terminal 61 can be located in the cavity 70 of the injection mold 100 firmly. Then, a number of thermoplastic resins are injected into the cavity 70 through the sprue channel 90 to mold the electronic product 60 in the cavity 70, wherein the electronic product 60 includes the terminal 61 and an insulating housing 62 molded around the terminal 61.

Referring to FIGS. 1-2, when the injection mold 100 is opened, the stationary mold 10 moves upward, and the first sliding block 30 and the second sliding block 40 move away from each other. The supporting pole 50 is retracted to the through-hole 31. At last, the electronic product 60 is ejected upward out of the cavity 70 of the injection mold 100 by the ejector pins 80.

As described above, the bottom end of the terminal 61 is inserted in the fastening hole 24 through the cavity 70, and the top end of the terminal 61 is restrained in the groove 41 with the top head thereof abutting against the top sidewall of the groove 41 and the side thereof abutting against the inner sidewall of the groove 41 to avoid the terminal 61 moving upward or downward in the cavity 70. Moreover, the supporting pole 50 is stretched into the cavity 70 to resist against the another side of the top end of the terminal 61 and clip the top end of the terminal 61 between the supporting pole 50 and the second sliding block 40, so that can further prevent the terminal 61 randomly swaying in the cavity 70. So the terminal 61 is located in the cavity 70 firmly. As a result, a deformation of the terminal 61 is avoided accordingly in process of injecting the thermoplastic resins into the cavity 70. Furthermore, production rate of the electronic product 60 can be assured, and cost of manufacturing the electronic product 60 is lowered.

What is claimed is:

1. An injection mold for molding an electronic product which has a terminal, comprising:
   a movable mold, a top of the movable mold defining an opening, a portion of a bottom of the opening extending downward to form a fastening hole for fastening a bottom end of the terminal therein;
   a first sliding block movably mounted on one side of a top of the movable mold, the first sliding block defining a through-hole levelly penetrating therethrough;
   a second sliding block movably mounted on the other side of the top of the movable mold, an inner sidewall of the second sliding block facing the first sliding block defining a groove vertically penetrating through a bottom thereof, the first and second sliding blocks being located at two opposite sides of the opening and capable of moving towards each other to make a top end of the terminal restrained in the groove, an inner sidewall of the first sliding block being further spaced from the top end of the terminal and the second sliding block to cooperate with the opening to together define a cavity, the through-hole having an inner end thereof connected with the cavity;
   a supporting pole movably inserted in the through-hole and further stretching into the cavity to resist against a side of the top end of the terminal for further clipping the top end of the terminal between the supporting pole and the second sliding block; and
   a stationary mold capable of being positioned on the first and second sliding blocks to cooperate with the cavity for molding the electronic product, the stationary mold defining a sprue channel connected with the cavity.

2. The injection mold as claimed in claim 1, further comprising two ejector pins, a bottom of the movable mold abreast defining two ejector pin holes penetrating through the movable mold and communicating with a bottom of the opening, the ejector pins being movably inserted in the ejector pin holes respectively for ejecting the electronic product upward out of the cavity.

3. The injection mold as claimed in claim 2, wherein the ejector pin holes are opened at two opposite sides of the fastening hole.

4. The injection mold as claimed in claim 1, wherein the movable mold includes a movable mold plate and a movable mold core disposed in a top of the movable mold plate, the opening is opened in a top of the movable mold core.

\* \* \* \* \*